2,733,167
Patented Jan. 31, 1956

2,733,167
METHOD OF ADHERING GOLD TO A NON-POROUS CERAMIC SURFACE AND COMPOSITION THEREFOR

Stanley Donald Stookey, Corning, N. Y., assignor to Corning Glass Works, Corning, N. Y., a corporation of New York No Drawing. Application May 8, 1953,
Serial No. 353,919

5 Claims. (Cl. 117—46)

This invention relates to the art of decorating or metallizing a non-porous ceramic surface, particularly a vitreous ceramic surface, by forming a thin adherent gold film on such surface. It is customary to employ preparations known as liquid bright gold compositions in the formation of such gold films and the present invention is particularly directed to improved compositions of this type.

The term "liquid bright gold" refers to organo-gold-containing liquid preparations which, when applied to non-porous ceramic surfaces and fired to volatilize or burn off the organic matter present, form thin lustrous gold films. For a description of such preparations and the utilization thereof, reference is made to several articles by F. Chemnitius appearing in Sprechsaal 60, part I, pages 182–184, 313–14 (1927) and Sprechsaal 61, part II, pages 748, 767 (1928).

In general, it may be said that such liquid bright gold preparations comprise essentially an organic vehicle, usually an essential oil or an organic constituent thereof, and an organo-gold compound soluble in, or compatible with, such vehicle. Such compound may be a gold resinate as described by Chemnitius, or a mixture of mercaptides and organic sulphides of gold. Additionally, such prepartions may, and usually do, contain organo-compounds of other metals in relatively minor amounts, the individual metal equivalents of such compounds being in the range of 0.01–05% by weight, such metals including Bi, Cr, Rh, Ni, and Co, for the purpose of variously modifying the adherence and appearance of the gold film producing on firing. The particular composition of such preparations varies, of course, in accordance with the nature of the ceramic surface to be decorated and the firing cycle to be employed. A typical preparation recommended by Chemnitius, when reduced to metal or metal oxide weight-equivalents, contains approximately 12% Au, 0.045% Rh, 0.4% $Bi_2O_3$ and 0.048% $Cr \cdot O_3$.

Liquid bright gold compositions such as described above are applied to predetermined surface areas on a non-porous ceramic article either manually as by brushing by hand or mechanically as by an automatic decorating machine. Subsequently the article is fired at a temperature sufficiently below its softening point and for a time sufficiently short to avoid deformation, but sufficient to eliminate the volatile or combustible organic material and leave on the article an adherent mirror-like film of gold. Gold films so produced are widely used in decorating glass, or glazed-china tableware, vases and similar articles.

When such bright gold decorations are applied to glassware which is to be tempered, that is, uniformly heated to a relatively high temperature and then suddenly cooled, it is desirable to avoid an extra heating step by firing the applied gold preparation onto the glass at the same time that the article is being heated for tempering. Under such conditions, however, the adherence of the gold to the glass is not satisfactory, because the length of time that the glass can be heated without deformation at the higher temperature desirable for tempering is insufficient to properly unite the gold with its surface with the result that subsequent repeated washing of the ware with alkaline detergents causes removal of the gold film.

I have now discovered that the adherence of bright gold decorations to tempered glassware and their resistance to the action of alkaline solutions can be substantially improved by incorporating into the gold containing film an amount of copper such that the weight-equivalent ratio of Au to Cu is from about 8/1 to 30/1. Thus by adding a flux comprising a compatible compound of copper in such ratio to a conventional liquid bright gold preparation, applying the preparation in the conventional manner to a glass article and then conventionally tempering the article, a strongly adherent bright gold containing film having satisfactory alkali resistance is produced.

In carrying out my invention, any conventional liquid bright gold preparation may be employed as a base material or an equivalent preparation may be compounded. This base material comprises essentially an organo-gold compound and a vehicle or solvent therefor. The vehicle may preferably be one of the essential oils such as oil of rosemary, oil of sassafras, oil of lavender, or poppyseed oil, or turpentine. Alternatively the constituents of such liquids, for example, long-chain fatty acids or pinene may be used. The organo-gold compound may be a resinate, mercaptide, organo-sulphide, or the like. Optionally, another organo-metal compound of the type indicated above may be present. In order to give body to the preparation a compatible resin such as coumarone may be included in the vehicle.

According to my invention, a compatible copper compound is included as a flux in such base material in an amount such that the ratio of the respective Au and Cu weight-equivalents of the gold and copper compounds is from about 8/1 to about 30/1. If the amount of the copper compound is appreciably less than indicated by such ratio range, no effective improvement in alkali resistance is imparted to the gold film; on the other hand if the copper compound is present in too large an amount, the gold film tends to have a dull brownish color rather than the desired bright mirror finish. Liquid bright gold preparations generally contain a gold compound in an amount equivalent to about 10–12 Au by weight; and I find that it is generally desirable to utilize the copper compound in an amount equivalent to about 0.4–1.3% Cu by weight. Desirably a smaller amount rather than a larger amount of copper is employed.

Any inorganic or organic compound of copper which is compatible with the liquid bright gold preparation and which does not leave an undesirable residue on firing may be used. Cupric chloride dihydrate, $CuCl_2.2H_2O$, is particularly satisfactory because it is readily available, is easily handled and is compatible with liquid bright gold preparations. Anhydrous cupric chloride, copper oleate, and other compatible copper compounds may also be used. Organic compounds, such as copper resinate and copper stearate, which have such high organic contents that they leave a carbonaceous residue on firing, are generally unsatisfactory.

Example 1

By way of specific example a commercial liquid bright gold composition known as Dupont Liquid Bright Gold #5836, which is a preparation comprising essentially an organo-gold compound and an organic solvent therefor and which has a gold weight-equivalent of about 11% Au, was treated as follows: A solution of $CuCl_2.2H_2O$ was prepared by dissolving 1 gram of the copper salt in 5 grams of methanol. Such solution was added to the liquid bright gold composition in an amount sufficient to produce in the mixture a copper weight-equivalent of about 0.43% Cu or a weight-equivalent ratio of Au to Cu of about 25/1.

The resulting preparation was applied to an article composed of a conventional fluoride opal glass. The coated ware was fired for seven minutes in a kiln in which the temperature was rapidly raised from an initial 400° C. to a maximum of 700° C. to fire the gold film and to permit tempering of the article which was accomplished by immediate rapid chilling thereof.

For comparison, a similar article coated with the conventional preparation, that is with no copper compound added, was fired simultaneously under the same conditions. Each glass article had an initially adherent bright gold film formed on its surface. However, when subjected to an accelerated alkali-resistance test, the copper-containing film was substantially unaffected and rated excellent while the copper-free film rubbed off easily and was rated unacceptable. The alkali-resistance test consisted in exposing the fired gold film to a boiling dilute alkali solution (3 grams NaOH/1 gallon $H_2O$) for a half hour and then testing adherence by manually rubbing the film with a damp cloth.

*Example 2*

The liquid bright gold composition referred to in Example 1 was treated by adding thereto an amount of a 40% by weight solution of copper oleate in warm terpineol sufficient to produce in the mixture a copper weight-equivalent of about 0.4% Cu or a weight-equivalent ratio of Au to Cu of about 27/1. Such mixture, when applied to an opal glass and fired as described in Example 1, successfully withstood the above-mentioned alkali-resistance test.

While it might be expected that silver, which is a member of the copper subgroup of the first periodic group, would also react like copper and have a beneficial effect on the adherence of the bright gold film, I have found that silver is not effective when substituted for copper in the above-described process.

This invention is also applicable and beneficial in the production of non-tempered gold-decorated glassware and other types of gold-decorated non-porous ceramic ware. The present process not only substantially improves the alkali resistance of such gold decorations without change in the temperature and time of firing, but also provides adequate alkali resistance with shorter times of firing.

What is claimed is:

1. A liquid gold ceramic-decorating composition of the type comprising essentially an organo-gold compound, an organic solvent therefor, and a flux said flux comprising a compatible compound of copper, the weight-equivalent ratio Au/Cu being from about 8/1 to about 30/1.

2. A composition in accordance with claim 1, in which the copper compound is present in an amount equivalent to about 0.4–1.3% Cu by weight.

3. A composition in accordance with claim 2, in which the gold compound is present in an amount equivalent to about 10–12% Au by weight.

4. A composition in accordance with claim 2, in which the copper compound is $CuCl_2.2H_2O$.

5. The method of improving the alkali resistance of a gold film fired onto the surface of a non-porous ceramic article, which includes providing a liquid gold containing decorating composition containing as essential ingredients an organo compound of gold and a compatible compound of copper in amounts such that the ratio of the respective Au and Cu weight-equivalents thereof is from about 8/1 to about 30/1, applying a thin layer of such composition to predetermined portions of a surface of such article, and firing the coated article to produce an adherent metallic film.

References Cited in the file of this patent

UNITED STATES PATENTS 2,490,399     Ballard  ---------------- Dec. 6, 1949